Nov. 3, 1925.

R. PEALE

CONVEYER

Filed Jan. 12, 1920

INVENTOR
Richard Peale
BY
John D Morgan
ATTORNEY

Nov. 3, 1925.

R. PEALE

CONVEYER

Filed Jan. 12, 1920

INVENTOR
Richard Peale
BY
John D. Morgan
ATTORNEY

Nov. 3, 1925.  1,559,772
R. PEALE
CONVEYER
Filed Jan. 12, 1920    8 Sheets-Sheet 3

INVENTOR
R. Peale
BY
John D. Morgan
ATTORNEY

Nov. 3, 1925.  R. PEALE  1,559,772
CONVEYER
Filed Jan. 12, 1920   8 Sheets-Sheet 4

INVENTOR
Richard Peale
BY
John D. Morgan
ATTORNEY

Nov. 3, 1925.

R. PEALE

CONVEYER

Filed Jan. 12, 1920   8 Sheets-Sheet 5

INVENTOR
Richard Peale
BY
John D. Morgan
ATTORNEY

Nov. 3, 1925.

R. PEALE

CONVEYER

1,559,772

Filed Jan. 12, 1920   8 Sheets-Sheet 6

INVENTOR
Richard Peale
BY
John W Morgan
ATTORNEY

Nov. 3, 1925.  
R. PEALE  
CONVEYER  
Filed Jan. 12, 1920  
1,559,772  
8 Sheets-Sheet 8

INVENTOR  
Richard Peale  
BY  
John D. Morgan  
ATTORNEY

Patented Nov. 3, 1925.

1,559,772

UNITED STATES PATENT OFFICE.

RICHARD PEALE, OF ST. BENEDICT, PENNSYLVANIA, ASSIGNOR TO REMBRANDT PEALE, OF ST. BENEDICT, PENNSYLVANIA.

CONVEYER.

Application filed January 12, 1920. Serial No. 350,731.

*To all whom it may concern:*

Be it known that I, RICHARD PEALE, a citizen of the United States, and a resident of St. Benedict, in the county of Cambria and State of Pennsylvania, have invented certain new and useful Improvements in Conveyers, of which the following is a specification.

The invention relates to an endless conveyer mechanism, and in certain of its aspects the invention relates more particularly to a conveyer mechanism particularly adapted for use in coal mining, especially in direct mining work, such as room work, breakthrough work or long wall work, in relatively thin coal seams or veins.

Objects and advantages of the invention will be set forth in part hereinafter, and in part will be obvious herefrom, the same being attained and realized by means of the instrumentalities and combinations pointed out in the appended claims.

The invention consists in the novel parts, constructions, arrangements, combinations and improvements herein shown and described.

The accompanying drawings, herein referred to and constituting a part hereof, illustrate one embodiment of the invention, and together with the description serve to explain the principles of the invention.

Referring to the accompanying drawings, illustrating by way of example one embodiment of the invention, my conveyer is shown applied to use in a coal mine, and particularly to room and entry use in a vein of relatively small thickness or height. In practice the great majority of the veins which are worked are from twenty-four to thirty-six inches in height. The problem of transporting the coal from the numerous and rapidly advancing room faces back to the entry in such thin veins is a very acute problem, involving considerations of expense, waste of time, and hardship to workmen, when they are directly employed upon such work. Objects of the present invention are to obviate the necessity of requiring workmen to travel to and fro in such cramped or restricted space, to avoid the expense and labor of "shooting" or excavating the top or bottom rock in the rooms; and to provide an automatic conveyer which is simple and reliable, possessed of but little and rugged mechanism, and having a simple and practically automatic drive; to provide such a conveyer which is rapidly and easily extensible as the room faces advance, and which is easily and quickly taken down from an old room or location and set up in another or a new location. To provide a conveyer which has a widely elastic load capacity, which will discharge automatically into the conveying means in the entry, or to other conveying means in the room, and which is adaptable to the various kinds of mining, such as room work, break-through or cross-cut work, pillar drawing, or long-wall work, as may be required.

In one of its features the invention provides for a pair of supporting and propelling cables running in parallel relation with each other, and supporting the body or load carrying part of the conveyer between them, the cables in turn running in or upon suitable guiding and supporting devices The cables, whether of rope, chain or other suitable form, are endless and preferably are returned in an idle reach beneath the loaded reach or path of the conveyer.

The devices or means by which the conveyer body or load-carrying part is attached to and supported from the cables are fixed to and regularly spaced apart along both the cables and the conveyer body, and, in accordance with one feature of the invention, the driving means engage with these spaced apart devices to propel the cables and the conveyer. The driving means is preferably placed at the discharge or initial end of the conveyer mechanism.

In one aspect of the invention, the conveyer is readily extended by attaching or inserting lengths of cable and extending the conveyer body correspondingly, maintaining the spaced relation between the attaching devices between the cables and conveyer body, where these are employed for driving the conveyer mechanism. Such cable lengths can be standardized so as to fit in very exactly and in the manner desired. Where the conveyer is used in coal mining, the roof props are usually utilized as supports for the cable sheaves or other guiding means, and these props can be set to fit exactly with the extensions of the conveyer.

The conveyer mechanism in connection with its simple and sturdy structure is very compact, and lends itself not only to easy and gradual extensibility, but also to one conveyer emptying into another. This may be at the juncture of a room with its entry or heading, or it may be where the conveyer from a break-through empties into the conveyer operating from the room face back to the entry or heading. The automatically operating conveyers, and the automatic cooperation of the conveyers, provide an entirely flexible and adequate coal or other material delivery or transporting means whereby any one part of the workings can get rid of dislodged coal without waiting upon or interfering with any other part. The expensive and vexatious problems of car pushing or hauling in the low rooms and travel of employees to and fro in connection therewith in such restricted space are avoided.

In certain cases it may be either desirable or necessary for the conveyer to turn an angle, and in accordance with one feature of the invention means are provided for running the conveyer around an angle or corner, as will be later described in detail.

The various features or aspects of the invention thus briefly outlined may be utilized together, or caused to cooperate, or some or any of them may be employed without the others. Additional features of the invention, also, will be set forth in connection with the detailed description of the present illustrated embodiment.

As stated, the invention is especially adaptable in many respects to meet the requirements and problems of mining, especially in thin veins or seams, and as embodied herein it has been shown and described as applied to such mining conditions, but the invention is also applicable to other uses.

Referring in detail to the embodied form of the invention, illustrated by way of example in the accompanying drawings, a conveyer 1 is provided, equipped on either side with supporting and propelling cables or the like 2 and 3. The conveyer body is attached thereto by suitable means which means, as already stated, according to one feature of the invention, also cooperate with the driving means to propel the conveyer. Suitable guiding and supporting devices are likewise provided for the cables 2 and 3, which cables carry the loaded and empty reaches of the conveyer and direct it along its path. These cable supporting and guiding devices cooperate also with the means for attaching the cable body to the cables, which latter will be first described.

As embodied in the present invention, the body 4 of the conveyer is preferably formed in sheets, which are fastened together at their adjoining or overlapping ends which lie transversely to the path of travel of the conveyer. The body 4 of the conveyer is supported by members 5 at either side, which are fixed to the supporting and propelling cables 2 and 3. The members 5 have fixed or attached thereto plates 6 and 7 between which the sheets 4 of the conveyer body are clamped and held by suitable means, such as the rivets 8.

The supporting and guiding means for the supporting and progressing cables 2 and 3, shown in Figs. 1, 2, 3, 9, 10 and 11 comprise sheaves mounted on mine props, and are adapted to cooperate both with the cables and with the members 5. As embodied in the present invention, the sheaves 10 are rotatably mounted in two parallel series and in alinement in each series along the path of the conveyer. The roof props 11 and 12, arranged in parallel rows in the room are utilized for this purpose. The sheaves 10 are shown mounted on bolts 13, the bolts being fastened into position by nuts 14. The bolts are each provided with a shouldered head 15, to hold the sheave, and a friction plate 16 is interposed between the sheave and the prop, which plate is secured in a suitable manner, as by screws or spikes 17.

Figures 5, 6:
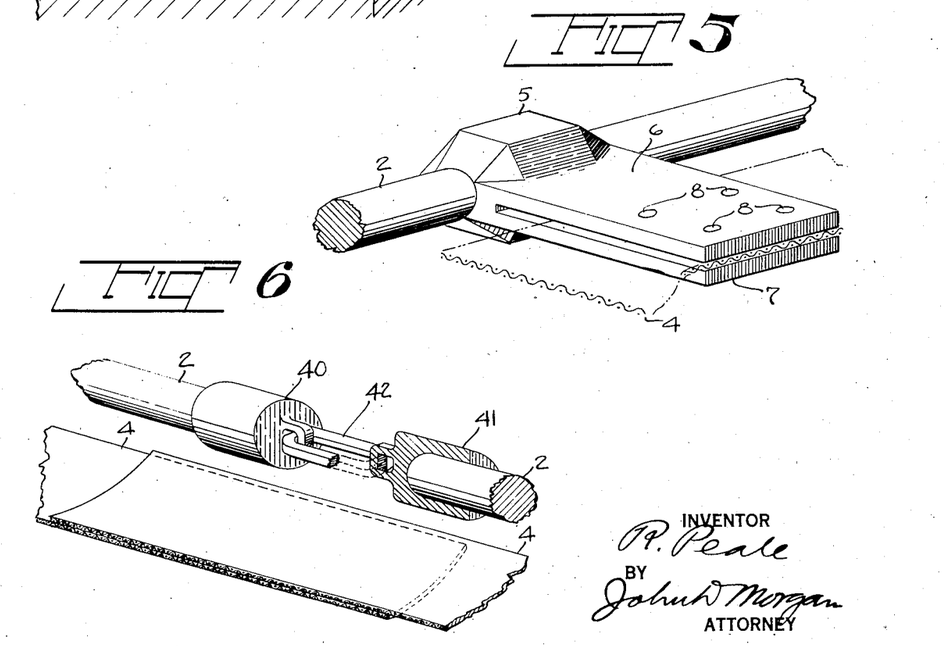
Fig. 5 is an enlarged fragmentary perspective detail of one of the cables and of the means for attaching the conveyer belt or body thereto, which means is also utilized for driving the belt.
Fig. 6 is an enlarged perspective fragmentary detail of a form of means for joining two sections of the supporting and propelling cables, or like devices for the conveyer.
Figure 10:
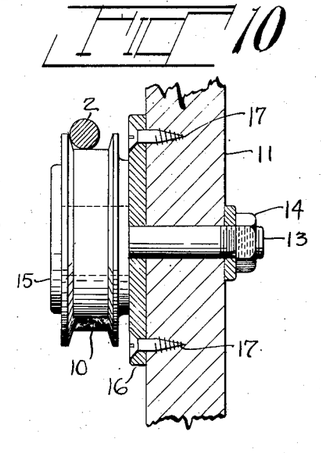
Fig. 10 is an enlarged fragmentary detail of one of the supporting sheaves, shown in Figs. 1 and 2 and on the right hand side in Fig. 9, and showing one of the supporting and propelling cables running on one of the sheaves.
Figure 11:
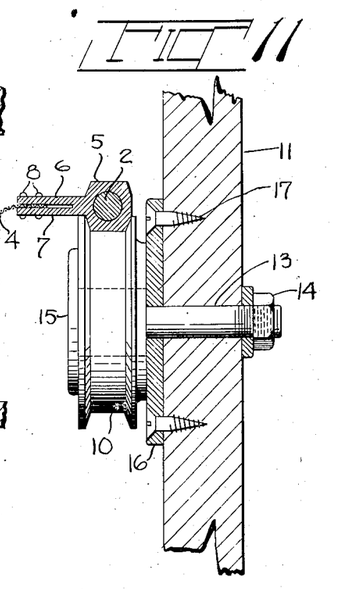
Fig. 11 is a view similar to Fig. 10, but showing one of the conveyer belt or body supporting members which are fixed on the cable passing over the sheave.

The intermediate stretches of the cable will run between the flanges of the sheaves 10, as shown in Fig. 10, and the supporting members 5 are beveled fore and aft, as shown in Fig. 5, so that when they engage with the sheave they will gradually ride up thereon, the body of the support 5 resting within the flanges of the sheave, and the projecting portion 7 resting upon the edge or periphery of the inner flange of the sheave. This embodied form of support is reversible, that is, it will engage and cooperate with the sheave precisely in the same manner on the forward traveling, upper, loaded reach of the conveyer as upon the bottom and rearwardy traveling returning idle reach of the conveyer.

Figure 4:
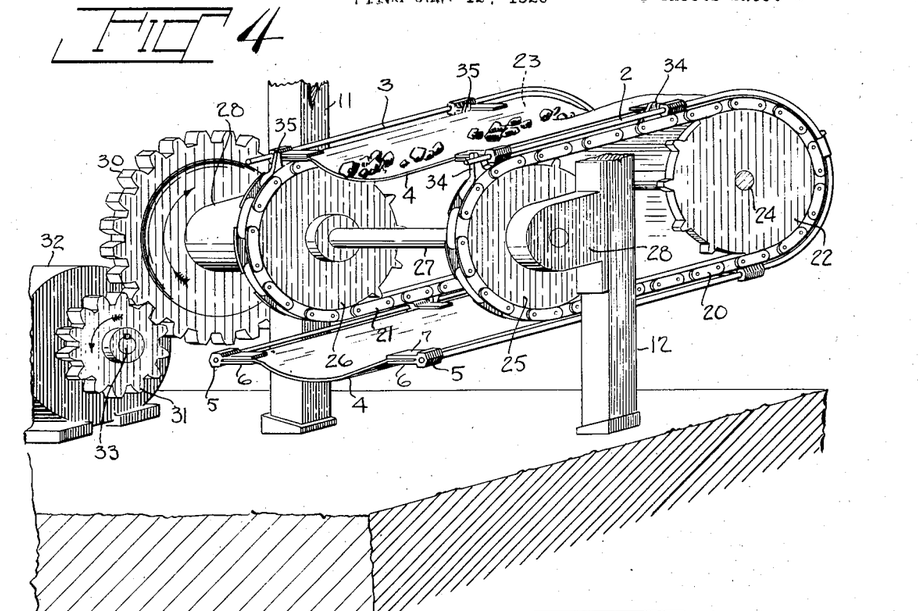
Fig. 4 is an isometric projection, showing the driving mechanism for the conveyer in greater detail than in the preceding figures.

The embodied form of driving means, as already indicated, cooperates with the conveyer supporting members 5 to propel the cables 2 and 3, and therewith the conveyer body. In the illustrated embodiment, there is provided, at either side, sprocket chains 20 and 21 running over idler sprocket wheels 22 and 23, which wheels are fixed on the shaft 24. Chains 20 and 21 also run over driven sprocket wheels 25 and 26, which wheels are fixed on a shaft 27, journaled in bearings 28. Fixed on shaft 27 is a gear wheel 30, meshing directly or indirectly with a pinion 31, which pinion is fixed on the shaft 33 of a motor 32. Fixed on the sprocket chains 20 and 21, respectively, are a series of spaced lugs 34 and 35, which are spaced apart to engage behind the plates 6 and 7 of the conveyer supporting and driving members 5, as will be seen from Fig. 4, and thus drive or propel the conveyer. This provides a simple, direct and rugged drive, which engages with the conveyer mechanism both on the loaded forward reach and the return idle reach, and also provides the turning mechanism for the conveyer, as the cables 2 and 3 rest upon the sprocket chains 20 and 21 in approaching the reversing turn as well as in going thereabout.

One important feature of my invention is its easy and rapid extensibility. In thin veins and soft coal, the room face advances relatively rapidly, and it is essential that the room conveyer be kept within convenient distance of the advancing room face to avoid unnecessary handling of the coal. It is also essential that extensions to the conveyer be made quickly, preferably by unskilled labor, and without interfering with the driving means. Additional lengths of the cables 2 and 3 are provided, which may be inserted or clamped into the cables in operation, and in Fig. 6 of the drawings such a clamp is shown. The cable ends are provided respectively with sockets 40 and 41, with a connecting link 42. The links 42 may be opened and a cable length very quickly and easily inserted.

The sheets 4 of the conveyer may be fastened together in any suitable manner, as by stitching, stapling or in other convenient ways. It will be essential in interposing additional lengths of cable to maintain the driving and supporting members 5 equally spaced apart. This is, however, a simple matter, as the mine props may be set at variable distances to suit the exact lengths of cable required.

Figure 1:
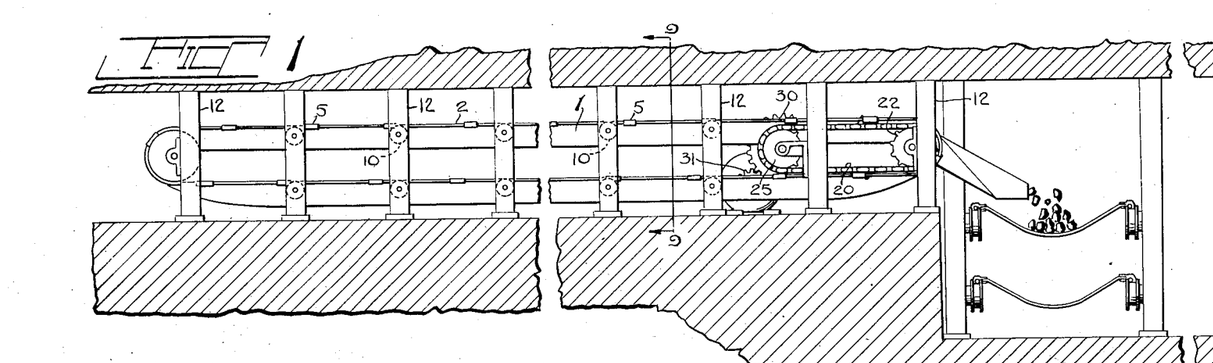
Fig. 1 is a fragmentary elevation of a conveyer constructed in accordance with the invention, working in a mine room, and showing also in transverse section a similar conveyer working in the entry, the first conveyer discharging into the second conveyer, the figure showing also the drive for the room conveyer.
Figure 2:
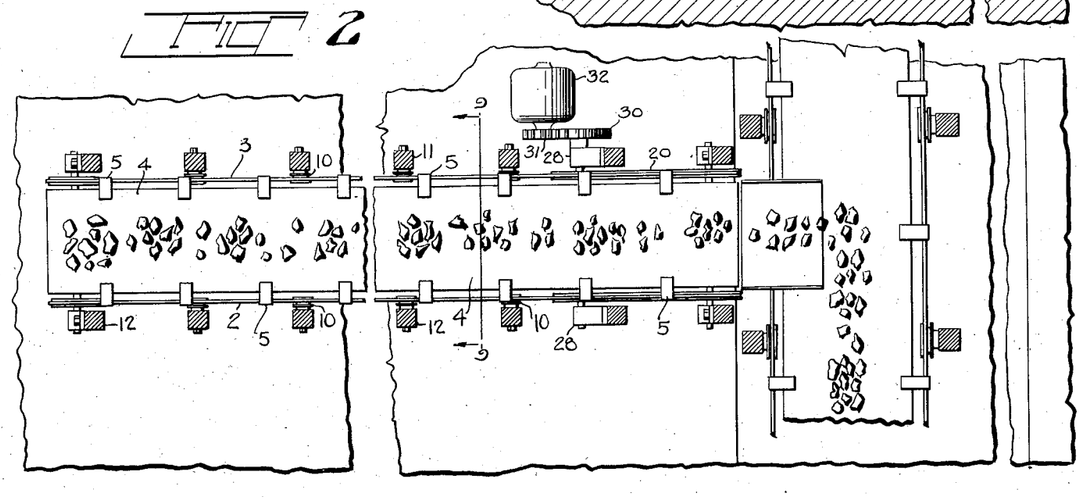
Fig. 2 is a top plan corresponding to Fig. 1.
Figure 3:
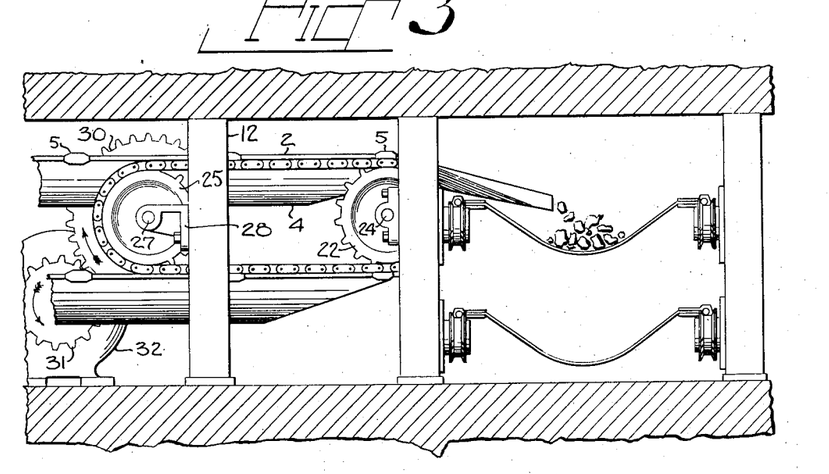
Fig. 3 is an enlarged detail of two cooperating room conveyers, showing one room conveyer in elevation, said conveyer discharging into a second conveyer, which is shown in vertical transverse section.

In Fig. 1 and Fig. 2, the system is shown applied to and cooperating with a common entry conveyer of structure generally similar to the conveyer herein previously described as applied to the rooms. Each room conveyer will discharge into the entry conveyer, independently of the other room conveyers, and thus an automatic, flexible and adequate system of transportation, wherein each room is independent of every other, is provided, the coal being moved at any time from the face of each room, to the entry and through the entry to a suitable place of discharge. There is no blasting or excavating of the top or bottom rock in the rooms, and there is no traveling to and fro of either laborers or cars in the cramped space and low height within the room. In Fig. 3 is shown an illustration of two conveyers cooperating in a room or other location in a relatively thin seam, where neither the top nor bottom is blasted. The conveyers are running at right angles to each other or approximately so, and are located as they would be for room or for break-through or cross-cut work. The conveyer shown in elevation in Fig. 3 may be regarded as conveying coal from a break-through and delivering it to the conveyer shown in Fig. 3 in cross-section, which may be regarded as the room conveyer, and for purposes of explanation may be identified with the conveyer shown in elevation in Fig. 1. The coal would thus be conveyed automatically from the cross-cut or break-through, and also from the room face, and delivered to the entry conveyer, and carried thereby to any desired point of discharge.

Figures 7, 8:
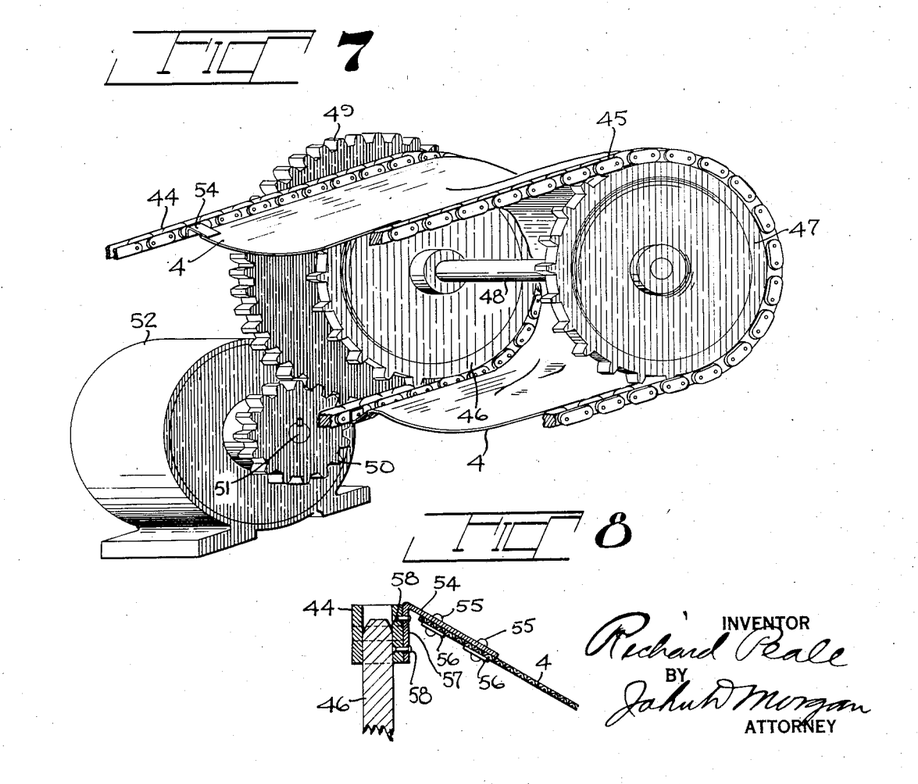
Fig. 7 is an isometric perspective of a chain cable for supporting and propelling the conveyer, and showing the application of a driving mechanism thereto.
Fig. 8 is an enlarged fragmentary detail, partly in section, showing a form of means for attaching the conveyer belt or body to the chain cable supporting and propelling means, shown in Fig. 7.
Figure 9:
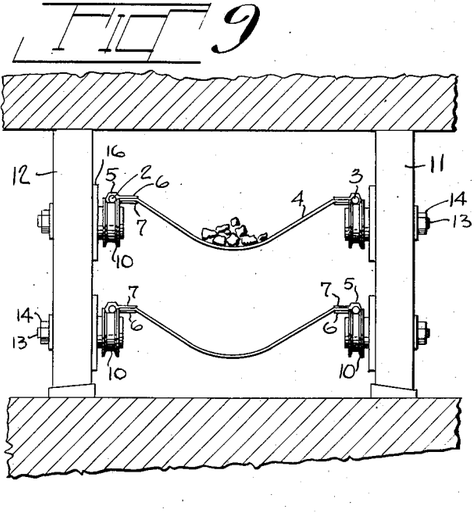
Fig. 9 is a transverse section on the line 9—9 of Fig. 1 and Fig. 2.

In Fig. 7 of the drawings there is shown a different form of the supporting and propelling cables, corresponding to the cables 2 and 3. In the exemplification of Fig. 7, the cables are shown as sprocket chains 44 and 45. The sprocket chains 44 and 45 run over sprocket wheels 46 and 47 fixed upon a shaft 48. In this case the wheels 46 and 47 serve as supports for the cables 44 and 45, serving also to reverse the travel thereof from the loaded and forward reach to the idle return reach, and also serving as the driving means, driving by direct engagement with the cable. Fixed to shaft 48 is a gear wheel 49, which meshes, either directly or indirectly, with the pinion 50, which pinion is fixed on the shaft 51 of a motor 52. The means for fastening the conveyer body 4 in this form to the cables does not necessarily have the additional function of cooperating with the conveyer driving means, and is therefore shown as simply a supporting device. As embodied in the present invention, it comprises a bent or angled plate 54, to which the body 4 of the conveyer is attached by bolts or rivets or other fastening means 55, plates 56 cooperating to firmly clamp and hold the conveyer body. The bent portion 57 of plate 54 rests against the side of the chain or cable 44, and is fastened thereto by bolts or rivets 58.

Figure 12:
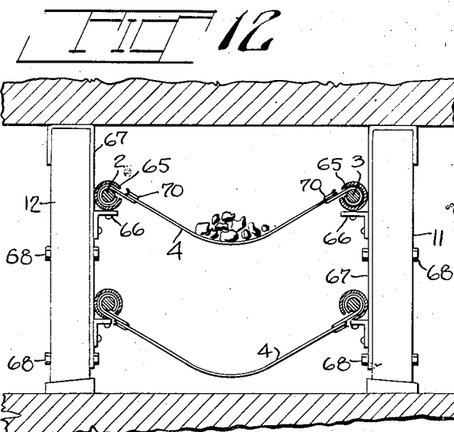
Fig. 12 is a transverse section, similar to Fig. 9, but showing a different form of supporting and guiding means for the supporting and progressing cables, which support the conveyer body.
Figure 13:
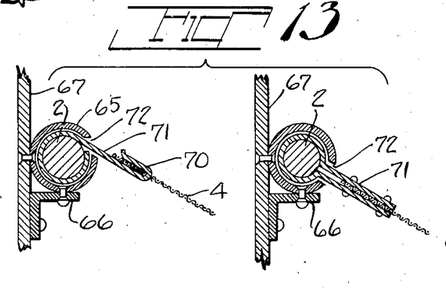
Fig. 13 is an enlarged fragmentary detail of the supporting and guiding means for the cables shown in Fig. 12.

In Figs. 12 and 13 a different form of guiding and supporting means for the cables 2 and 3 is provided. In this form of the device a pipe or conduit 65 is arranged longitudinally of and at either side of the conveyer, and these conduits rest respectively upon suitable supports, such as brackets 66. The brackets 66 are shown riveted to plates 67 fastened to the props 11 and 12 by suitable means, such as bolts 68. The cable supporting devices 70 are fixed to the cables 2 and 3, and run within the respective conduits 65. The devices 70 are preferably of somewhat round or spheroidal shape to avoid excessive friction or binding or jamming of the devices in the conduit. The devices 70 are provided respectively with an extension 71, projecting through a slot 72, formed longitudinally in the conduits 65, the extensions 71 and the slots 72, through which they project from within the conduit, being located and disposed so that the pull of the loaded conveyer is such or is in such direction that there is no frictional engagement between the extensions 71 and the edges of the slots 72, as will best appear from Fig. 13.

In many locations, where it is desired to convey the coal or other loose material along a curved or angular or other non-straight path, the construction shown in Figs. 1, 2, and 3 may be employed. In accordance with certain features of the invention, however, I provide for curving or turning a single conveyer. In Figs. 14 to 19, inclusive the form of conveyer shown in Figs. 1, 2, 9, 10 and 11 is applied to going around a right angle curve in Fig. 14 and half a right angle curve in Fig. 19, the intervening figures being cross-section views applied to Fig. 14, as described in the brief description of the drawings.

Figure 14:
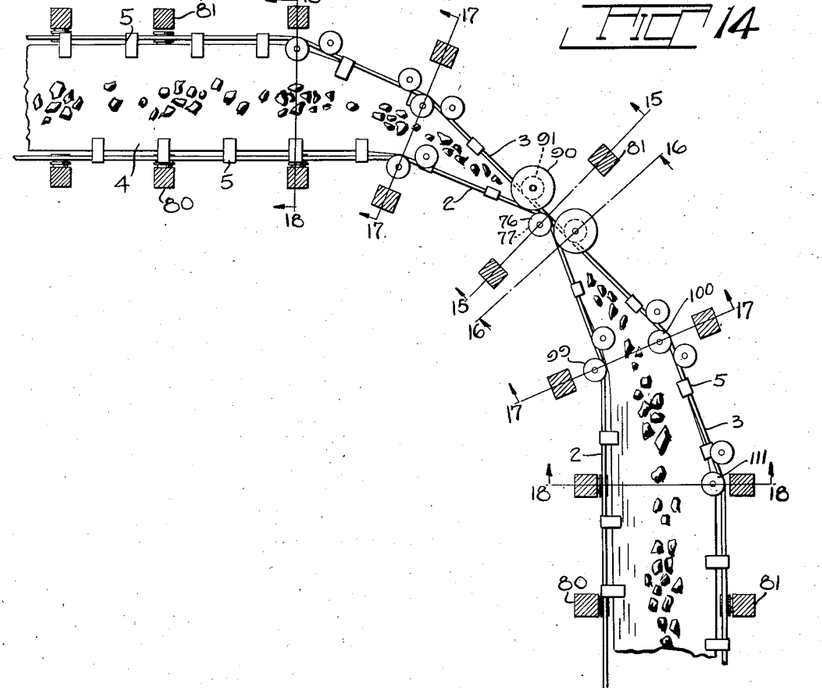
Fig. 14 is a plan of one form of mechanism for carrying the conveyer around a curve or angle.
Figure 19:
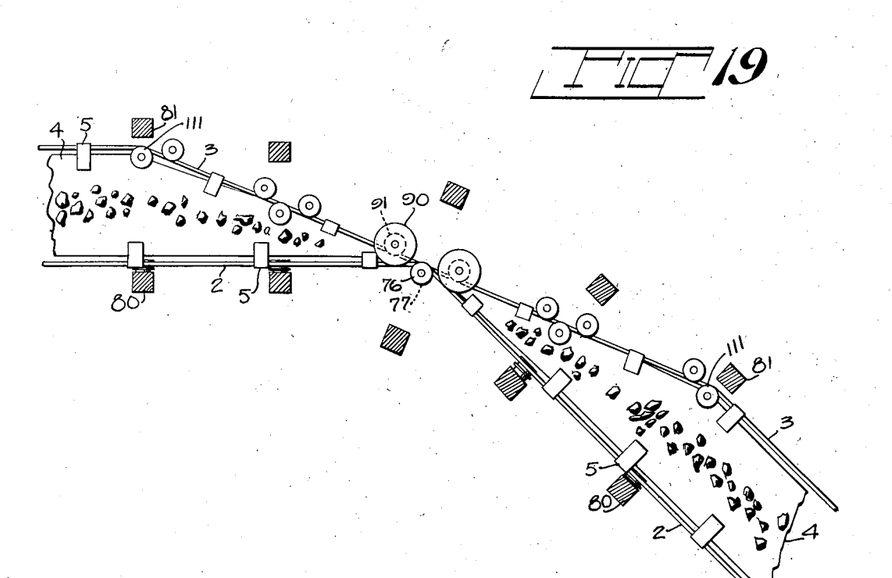
Fig. 19 is a top plan, similar to Fig. 14, but showing the conveyer going about an oblique curve, that is, one of about forty-five degrees.

In Fig. 14 and also in Fig. 19, the cables 2 and 3 are shown arranged along substantially equal paths as to length in passing around the curve or turn, which curve may be of greater or less magnitude. There is thus very little cross-hauling or diagonal displacement or disarrangement between the cables in going around the turn. It will be recalled that the driving mechanism is especially designed and operated to give precisely the same speed to each of the cables 2 and 3, and by making the path of each cable about the turn approximately of equal length to the other, the temporary disturbance of the relationship of the two cables, and consequent disturbance of the conveyer is negligible.

As illustrated, the cables 2 and 3 are gradually brought almost to an identical path, and are supported and guided and kept in their path by a series of cooperating and opposing horizontally disposed sheaves. Referring to Fig. 14 a plan view, partly diagrammatic, of a suitable arrangement of sheaves is shown.

Figure 15:
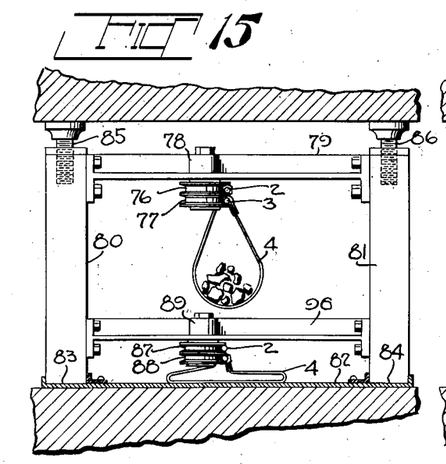
Fig. 15 is a vertical transverse section taken substantially on the line 15—15 of Fig. 14.

In Fig. 15 the cables 2 and 3 are shown one above the other, running against two horizontally disposed sheaves 76 and 77 respectively, supported on a shaft 78, carried by cross-beam 79, which is bolted to props or vertical supports 80 and 81. The flanges of the sheaves act to vertically support the cables, as will be clear from the drawing. The props 80 and 81 are shown with their bottoms nested in seats 83 and 84 in a plate 82. The props are shown provided with jack screws 85 and 86 to tighten them in position between the mine floor and roof. When the cables 2 and 3 are in the position shown and described the conveyer is pocketed as shown in Fig. 15, but its carrying capacity is unimpaired for practical purposes. It however requires a greater vertical space for its free running. As embodied and illustrated it is permitted to run free, and the idle or return reach of the conveyer is correspondingly depressed. The cables 2 and 3 of the idle return reach of the conveyer run in sheaves 87 and 88 respectively carried upon a vertically disposed shaft 89, which is supported on a cross-beam 96, fastened to the props 80 and 81. Where the vertical space is small the idle reach of the conveyer body 4 may sweep along the plate 82 without damage, although if desired, the bottom could be excavated to permit it to hang freely.

Figure 16:
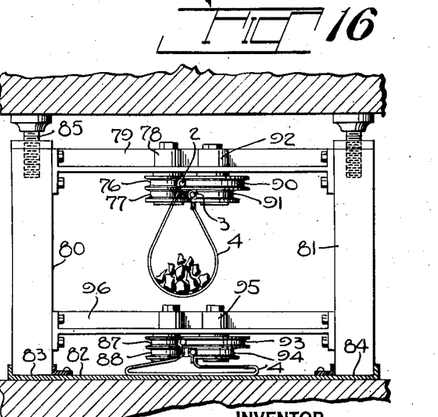
Fig. 16 is a vertical transverse section taken substantially on the line 16—16 of Fig. 14.

In Fig. 16 certain of the cooperating sheaves are shown. Cooperating with the cables 2 and 3, respectively, of the top or loaded reach of the conveyer, are horizontally disposed sheaves 90 and 91, mounted on a shaft 92, which is supported by beam or plate 79. The flanges of the sheaves act to support the cables vertically while the bodies of the sheaves direct the paths or directions of the cables, generally similarly to the mechanism of Fig. 15, already described. The cables 2 and 3 of the idle or bottom reach of the conveyer engage with horizontally disposed sheaves 93 and 94, respectively which are journaled on a shaft 95, supported in plate or beam 96.

Figure 17:
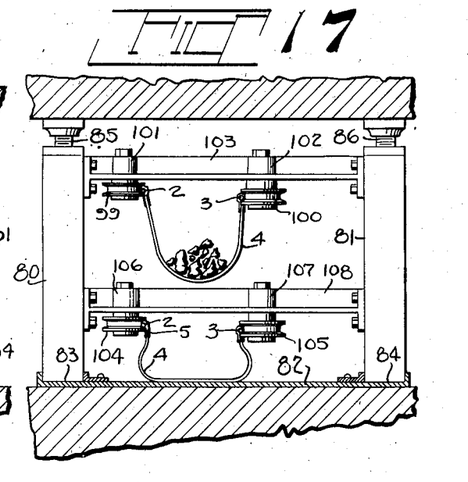
Fig. 17 is a vertical transverse section taken substantially on the line 17—17 of Fig. 14.

In Fig. 17 the cables 2 and 3 are diverging again and opening out the conveyer. Here the horizontally disposed sheaves 99 and 100 cooperate respectively with the two cables of the upper reach of the conveyer. These sheaves are journaled, respectively, on shafts 101 and 102, which are supported in a plate 103, carried by side props 80 and 81. In Fig. 17 the cables 2 and 3 of the lower reach of the conveyer run, respectively, in similar sheaves 104 and 105, journalled respectively on shafts 106 and 107, carried by the cross plate or beam 108.

Figure 18:
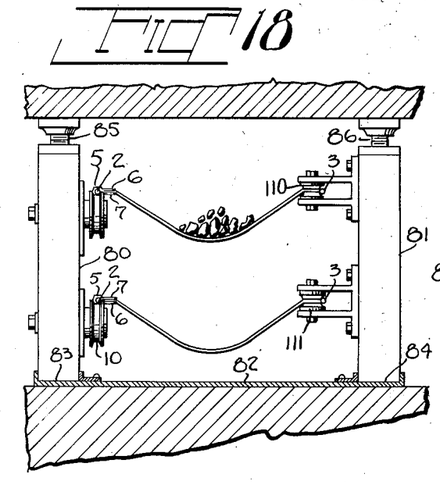
Fig. 18 is a vertical transverse section taken substantially on the line 18—18 of Fig. 14.

In Fig. 18 the cables 2 and 3 are represented as nearly back in their normal or parallel position with respect to each other. The sheaves at the left are shown vertically disposed, the same as in Figs. 3 and 9. On the right hand side in Fig. 18 sheaves 110 and 111 are shown somewhat inclined from the vertical to guide cable 3 and support it just before it assumes its full parallel position.

Figure 20:
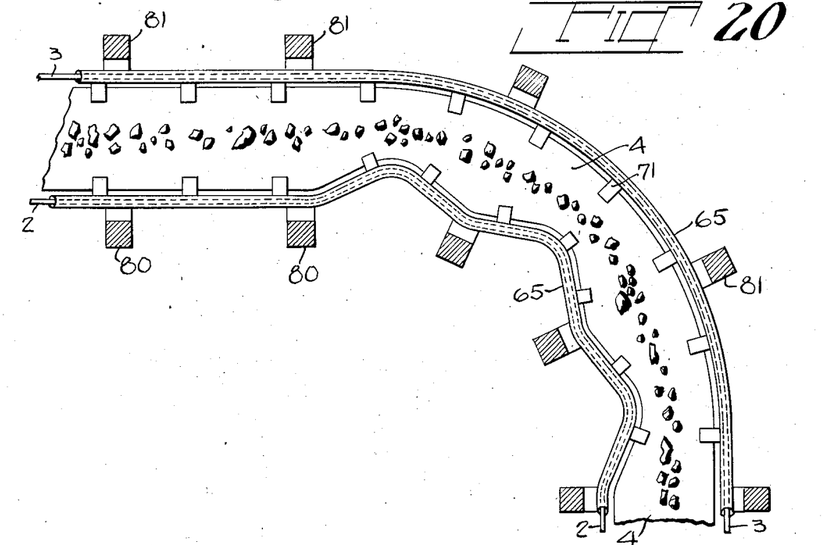
Fig. 20 is a top plan, showing the conveyer with cable supporting and guiding means of the kind shown in Figs. 12 and 13, going about a right angle curve.

In Fig. 20 is shown a plan of the form of cable guiding and supporting device shown in Figs. 12 and 13 going around a curve. In this arrangement, the inner and therefore shorter conduit 65 on the curve is curved inwardly and outwardly to make it of equal length with the outer conduit 65. Thus the cables 2 and 3 will keep substantially together in passing around the curve.

Figures 21, 22:
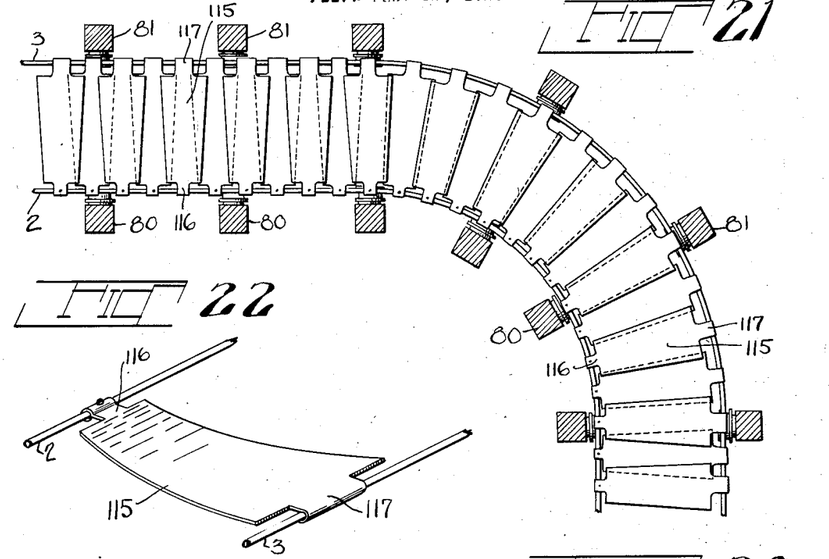
Fig. 21 is a top plan of a different form of conveyer passing around a curve at a right angle.
Fig. 22 is a fragmentary perspective view of the form of conveyer shown in Fig. 20.

In Figs. 21 and 22 one form of conveyer is shown which is adapted to travel about a curve. The cables 2 and 3 will be guided and supported in suitable manner, as upon the sheaves 10. The conveyer body in this case consists of a plurality of separate but lapping transversely disposed plates 115 of metal or other suitable material. The plates 115 are attached to cable 2 preferably by an extension 116 of the plate which is turned around and fastened to the cable. A similar extension 117 is turned around cable 3, but the cable 3 and extension 117 are free to move longitudinally with respect to each other, while plate 115 is supported both against the vertical load and lateral displacement. Plates 115 are preferably made wider at one side than the other when the conduit is intended to turn or curve to one side.

In Fig. 21 the conduit is shown passing around a ninety degree curve with straight stretches of the cable at either side. The supporting extensions or clips 117 slide on the cable 3 and the over-lapping of the plates 115 will maintain the body of the conveyer continuous in passing the curve. As the conveyer straightens out again after passing the curve, the supporting clips or extensions 117 will slide on cable 3 to adjust the plates to the change in position of the conveyer, the lapping of the plates again taking care of the changes in position.

Figures 23, 24, 25:
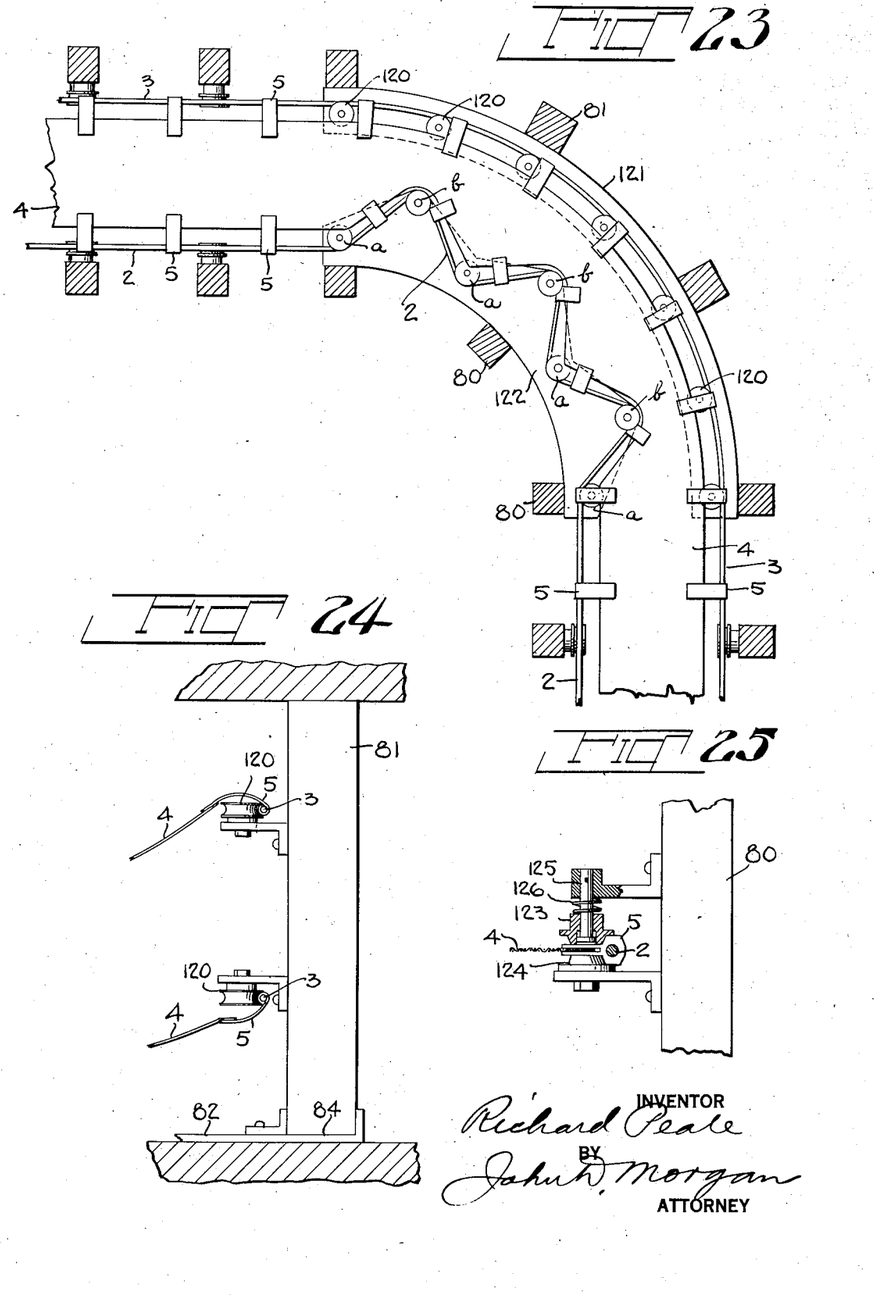
Fig. 23 is a top plan of a different form of conveyer passing around a curve at substantially a right angle.
Fig. 24 is a detail of the sheaves shown in Fig. 23.
Fig. 25 is a detail of another form of the sheave.

In Fig. 23 is shown a plan view of the form of conveyer shown in Figs. 1 to 4 passing around a ninety degree curve. In this instance the outside cable 3 is maintained practically along the full arc of the curve. The sheaves 120 as shown in Fig.

24 are designed and disposed to hold and guide the cable to its proper course, the resistance being mainly against the radial pull of the cable. Sheaves 120 are shown supported on a plate 121 carried by the posts or supports 81.

In this case also, the cable 2 is caused to travel a long or extended path along the inside of the conveyer to compensate for the difference in length of the arcs of cables 2 and 3, owing to the shorter radius of the former. As embodied here, a sheave 120 or pair of sheaves 123 and 124 press the cable 2 from the inside, that is from the conveyer side, as shown at a in Fig. 23. A succeeding sheave 120 or pair of cooperating sheaves 123 and 124 press the cable 2 inwardly toward the conveyer, as shown at b in Fig. 23, and so in alternation about the curve. The sheaves are supported on a plate 122.

In Fig. 25 sheave 123 is shown loose on its shaft 125, and spring pressed toward sheave 124 by a spring 126. Sheave 123 thus will ride up to pass the supporting clips 5 but thereafter will snap down and prevent cable 2 from springing out of the bite of the sheaves.

From all the foregoing it will be understood that a conveyer mechanism has been provided, realizing and embodying the objects and advantages herein set forth, together with other objects and advantages. It will be understood also that changes may be made from the details of construction herein shown and described within the scope of the accompanying claims, without departing from the principles of the invention and without sacrificing its chief advantages.

What I claim is:—

1. An endless conveyer mechanism including in combination two parallel rows of sheaves, two other parallel rows of sheaves in alinement thereover, endless cables which may be varied in length running in one direction on one pair of rows of sheaves and in the other direction on the other pair of rows of sheaves, an endless conveyer body which may be varied in length and means for attaching the conveyer body to the endless cables.

2. An endless conveyer mechanism including in combination two parallel rows of sheaves, two other parallel rows of sheaves in alinement thereover, endless cables which may be varied in length running in one direction on one pair of rows of sheaves and in the other direction on the other pair of rows of sheaves, an endless conveyer body which may be varied in length and means regularly spaced apart along the cables and conveyer body for attaching the conveyer body to the endless cables.

3. An endless conveyer mechanism including in combination two parallel rows of sheaves, two other parallel rows of sheaves in alinement thereover, endless cables which may be varied in length running in one direction on one pair of rows of sheaves and in the other direction on the other pair of rows of sheaves, an endless conveyer body which may be varied in length and means regularly spaced apart along the cables and conveyer body for attaching the conveyer body to the endless cables and means driving the conveyer by engaging with said attaching means.

4. An endless conveyer mechanism including in combination two parallel rows of sheaves, two other parallel rows of sheaves thereover, endless cables running in one direction on one pair of rows of sheaves and in the other direction on the other pair of rows of sheaves, an endless conveyer body and means regularly spaced apart along the cables and conveyer body for attaching the conveyer body to the endless cables and two endless sprocket chains, one at either side of the conveyer at one end of its path, the cables resting on said chains and means on the chains engaging said attaching means to drive the conveyer.

5. An endless conveyer mechanism including in combination two parallel rows of sheaves, two cables, each running on one row of sheaves, a conveyer body, and a plurality of attaching devices joining the conveyer body and cables and running over the sheaves and two endless sprocket chains, one at either side of the conveyer at one end of its path, the cables resting on said chains and means on the chains engaging said attaching means to drive the conveyer.

6. An endless conveyer mechanism including in combination two parallel rows of sheaves, two cables, each running on one row of sheaves, a conveyer body, and a plurality of regularly spaced apart attaching devices joining the conveyer body and cables and running over the sheaves and two endless sprocket chains, one at either side of the conveyer at one end of its path, the cables resting on said chains and means on the chains engaging said attaching means to drive the conveyer.

7. An endless conveyer mechanism including in combination two endless cables, a conveyer body therebetween, means attaching the conveyer body to both cables, and two endless sprocket chains, one at either side of the conveyer at one end of its path, the cables resting on said chains and means on the chains engaging said attaching means to drive the conveyer.

8. An endless conveyer mechanism including in combination two endless cables, a conveyer body therebetween, regularly spaced apart means attaching the conveyer body to both cables, and two endless sprocket chains, one at either side of the conveyer at one end of its path, the cables resting on said chains and means on the chains engaging said attaching means to drive the conveyer.

9. A conveyer mechanism disposed about a horizontal curve, and including in combination a conveyer body, two cables, one at each side of the conveyer body, means for suspending the conveyer body from said cables, and means for taking up the length of the inside cable in the curve.

10. A conveyer mechanism disposed about a horizontal curve, and including in combination a conveyer body, two cables, one at each side of the conveyer body, means for suspending the conveyer body from said cables, and means equalizing the length of the two cables in the curve.

11. A conveyer mechanism disposed about a horizontal curve and including in combination a conveyer body, two cables, one at each side of the conveyer body, means for suspending the conveyer body from said cables, and means including a plurality of sheaves equalizing the length of the two cables in the curve.

12. A conveyer mechanism disposed about a horizontal curve and including in combination a conveyer body, two cables, one at each side of the conveyer body, means for suspending the conveyer body from said cables, and means including a plurality of horizontally disposed sheaves equalizing the length of the two cables in the curve.

13. A conveyer mechanism disposed about a horizontal curve and including in combination a conveyer body, two cables, one at each side of the conveyer body, means for suspending the conveyer body from said cables, and means including a plurality of sheaves acting on both cables equalizing the length of the two cables in the curve.

14. A conveyer mechanism disposed about a horizontal curve and including in combination a conveyer body, two cables, one at each side of the conveyer body, means for suspending the conveyer body from said cables, and means including a plurality of horizontally disposed sheaves acting on both cables equalizing the length of the two cables in the curve.

15. An endless conveyer mechanism including in combination a pair of parallel horizontally disposed longitudinally slotted conduits, a pair of cables running in the conduits, a conveyer body and a plurality of attaching devices extending through said slots and connecting the conveyer body and the cables.

16. An endless conveyer mechanism including in combination a pair of parallel horizontally disposed longitudinally slotted conduits, a pair of cables running in the conduits, a conveyer body and a plurality of attaching devices extending through said slots and connecting the conveyer body and the cables, said slots and attaching devices being disposed in the line of pull of the loaded conveyer.

17. An endless conveyer mechanism including in combination a pair of parallel endless cables one at either side, supports for the cables on which they are free to run, and a conveyer body therebetween consisting of a plurality of sheets joined longitudinally to each other and attached to the cables, the cables having ends adapted to take insertible extensions.

18. An endless conveyer mechanism including in combination a pair of parallel endless cables one at either side and a conveyer body therebetween consisting of joinable sections, severally attached to the cables, the cables having ends adapted to take insertible extensions, means for supporting and guiding the cables, and means for driving the cables.

19. An endless conveyer mechanism including in combination a pair of parallel endless cables one at either side and a conveyer body therebetween, devices fixed to the cables and conveyer body attaching them together, the cables having their ends adapted to take insertible extensions, means for supporting and guiding the cables, and driving means engaging with said attaching devices and supporting the cables at their reversing point at one end of their path of travel.

20. An endless conveyer mechanism including in combination a pair of parallel endless cables one at either side and a conveyer body therebetween, consisting of a plurality of sheets joined longitudinally to each other and devices fixed to the cables and conveyer body attaching them together, the cables having their ends adapted to take insertible extensions, and means for supporting and guiding the cables, and driving means engaging with said attaching devices and supporting the cables for an extended distance at their reversing point at one end of their path of travel.

21. An endless conveyer mechanism including in combination two parallel rows of sheaves, cables running over the sheaves, a conveyer body, a plurality of attaching devices for supporting the conveyer body from the cables, the attaching devices at the cable ends thereof being shaped and sized to fit snugly within the sheave flanges.

22. An endless conveyer mechanism including in combination two parallel rows of sheaves, cables running over the sheaves, a conveyer body, a plurality of attaching devices for supporting the conveyer body from the cables, the attaching devices at the cable ends thereof being shaped and sized to fit snugly within the sheave flanges and to rest upon the inner flanges of the sheaves.

23. An endless conveyer mechanism including in combination two parallel rows of sheaves, cables running over the sheaves, a conveyer body, a plurality of attaching devices for supporting the conveyer body from the cables, the attaching devices at the cable ends thereof being shaped and sized at their forward ends to gradually ride up on the sheaves.

24. An endless conveyer mechanism including in combination two parallel rows of sheaves, cables running over the sheaves, a conveyer body, a plurality of attaching devices for supporting the conveyer body from the cables, the attaching devices at the cable ends thereof being shaped and sized at their forward ends to gradually ride up on the sheaves and being sized and shaped at their sides to fit snugly within the sheave flanges.

25. An endless conveyer mechanism including in combination two parallel rows of sheaves, cables running over the sheaves, a conveyer body, a plurality of attaching devices for supporting the conveyer body from the cables, the attaching devices at the cable ends thereof being shaped and sized at their forward ends to gradually ride up on the sheaves and being sized and shaped at their sides to fit snugly within the sheave flanges and to rest upon the inner flanges of the sheaves.

In testimony whereof, I have signed my name to this specification.

RICHARD PEALE.